United States Patent [19]

Emanuel

[11] 3,961,096
[45] June 1, 1976

[54] CONSERVATION AND CONVERSION OF POULTRY WASTE PRODUCTS

[75] Inventor: Mary Victoria Emanuel, Bellevue, Wash.

[73] Assignee: The Boeing Company, Seattle, Wash.

[22] Filed: Dec. 11, 1972

[21] Appl. No.: 313,788

Related U.S. Application Data

[63] Continuation-in-part of Ser. No. 207,488, Dec. 13, 1971, abandoned.

[52] U.S. Cl. ............................. 426/644; 426/646; 426/437; 426/807
[51] Int. Cl.² ............................................. A23J 1/00
[58] Field of Search .......... 426/425, 431, 436, 478, 426/480, 481, 210, 205, 208, 271, 644, 646, 657, 437, 506, 518, 807, 521, 455, 456, 464; 71/21, 22; 210/59, 64

[56] References Cited
UNITED STATES PATENTS

| | | | |
|---|---|---|---|
| 1,718,297 | 6/1929 | Maclachlan | 71/21 |
| 2,502,726 | 4/1950 | Horton | 71/21 |
| 2,906,615 | 9/1959 | Dumore | 71/21 |
| 3,108,868 | 10/1963 | Wade | 71/21 |
| 3,292,584 | 12/1966 | Brodrick | 426/244 |
| 3,375,116 | 3/1968 | Anthony | 99/2 |
| 3,547,612 | 12/1970 | Westelaken | 71/21 |
| 3,732,089 | 5/1973 | Megronigle | 71/21 |
| 3,776,188 | 12/1973 | Komakine | 71/21 |

FOREIGN PATENTS OR APPLICATIONS

| | | | |
|---|---|---|---|
| 81,310 | 4/1971 | Germany | 426/807 |
| 86,751 | 12/1971 | Germany | 426/807 |

OTHER PUBLICATIONS

Feeds and Feeding, Morrison, 22nd Ed., Morrison Pub. Co., 1957, pp. 937, 938.

*Primary Examiner*—Norman Yudkoff
*Assistant Examiner*—Hiram H. Bernstein
*Attorney, Agent, or Firm*—Robert W. Beach

[57] ABSTRACT

Poultry feces are processed through a digester and a separator to produce undissolved solid material and a liquid filtrate. The solid material contains primarily food undigested by the poultry which is blended with comminuted egg shells, comminuted feathers, nutrients to provide a balanced food and new food to produce feed for fowl or stock. The filtrate is chemically treated for recovery of uric acid precipitate, and the remaining filtrate is used as a bacterial culture to produce bacterial protein. Used liquid from the bacterial culture is used as hydroponic culture to grow green fodder.

6 Claims, 1 Drawing Figure

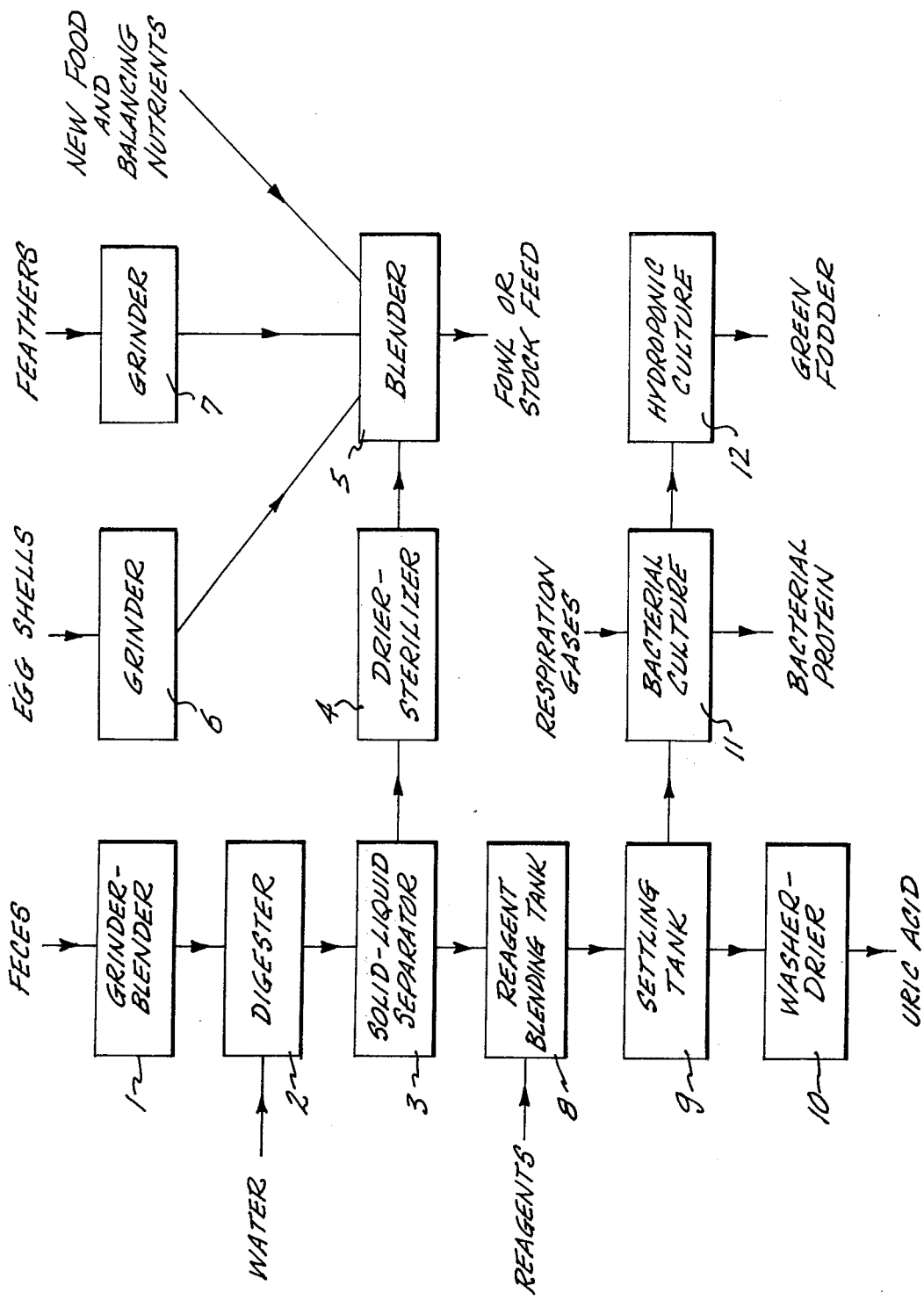

CONSERVATION AND CONVERSION OF POULTRY WASTE PRODUCTS

This application is a continuation-in-part of application Ser. No. 207,488, filed Dec. 13, 1971 and now abandoned, for Conservation and Conversion of Poultry Waste Products.

The present invention relates to a process for conserving food value from poultry waste products and for converting nonfood components into cultures utilized in the production of additional food, plus the recovery of chemical by-products.

More specifically, it is an object to utilize poultry waste products in the form of feces, egg shells and feathers for the maximum production of food products which can be utilized by such poultry and thereby reduce to the maximum extent the cost of feeding such poultry.

A further object of the invention is to recover and produce food from poultry waste products by the use of equipment and procedures which are practical and economical, which minimize unpleasant processing conditions and which equipment and procedures can process the material automatically and with minimum monitoring supervision and control.

An important object of the present invention is to minimize the problem of disposing of poultry waste products by conserving and converting them into useful products.

The drawing is a flow diagram representing sequential steps in the conservation and conversion process of the present invention.

The process of the present invention is particularly well suited to the conservation and conversion of waste products from chickens, but is also applicable to the utilization of waste products of poultry of other types. A principal function of the process is to recover undigested food from poultry feces for reuse as food. It has been found that as much as 80 per cent of the dry weight of poultry feces is composed of undigested food.

Poultry digests and utilizes approximately 80 per cent of the dry weight of food eaten. Feces excreted are approximately 75 per cent water, and of the 25 per cent dry material of the feces 80 per cent is undigested food. The purpose of the present invention is to recover such 80 per cent of the undigested 20 per cent of the original food, amounting to approximately 15 per cent to 16 per cent of the original food, and to utilize it as a refeeding ingredient. To recover, and thus conserve, such undigested food from poultry feces, the feces are first comminuted in a grinder-blender 1.

After being reduced to a substantially homogeneous condition, the comminuted material is transferred to a digester 2 in which water and base, such as alkali are added to the comminuted material. The proportion of water to comminuted material should be from one to three times as great a volume of water as of comminuted material, but preferably the ratio should be approximately equal volumes of water and comminuted material. The base can be of the organic or inorganic type, depending upon which type may be preferable for ultimate use of the liquid phase of the material. Potassium hydroxide and/or sodium hydroxide alkalis are suitable. The concentration of alkali may be within the range of 1 to 4 per cent of the weight of water, approximately 2 per cent being preferable. The principal purpose of the base solution added in the digester is to neutralize the acidity of the feces, to assist in solution of soluble ingredients of the feces and to disinfect the feces. The operation of the digester is conducted without the addition of heat other than that supplied by the base, the temperature being in the range of 60° F. to 90° F. The purpose of the digesting process is to dissolve from the comminuted feces all material which is soluble in the aqueous base solvent to produce a liquid phase and a solid phase.

The contents of the digester should be stirred continuously during the digesting process so as to bring all of the solid material into intimate contact with the treating liquid. Also, to facilitate such contact the feces should be ground so that at least most of the particles are less than one millimeter in maximum dimension. The digestion process should be accomplished in approximately fifteen minutes. The degree of digestion of the material will depend upon its composition, but the digestion should be sufficient so that the solid material recovered for food purposes does not have a disagreeable odor or appearance. From the digester, the digested material is transferred to a separator 3, by which the solid phase and the liquid phase are separated by settling, centrifuging, filtration, dializing or some combination of such operations.

The liquid phase of the separation includes soluble protein, inorganic salts, uric acid, bacterial products, and mucin. The separated solid material to be recycled as food enters the drier 4 in which excess moisture is removed. At the same time the material preferably is subjected to a temperature sufficiently high to sterilize it by killing bacteria.

It has been found that the food thus recovered from poultry feces may have a composition including 58 per cent of organic material and 42 per cent of inorganic material.

Such food may also contain:

| | |
|---|---|
| Fiber | 10.7% |
| Fat | 0.5 |
| Carbohydrate | 14.0 |
| Protein (based on N) | 5.8 |
| Nitrogen | 0.95 |
| Phosphate | 1.9 |

The amino acid content of the recovered food may be:

| | |
|---|---|
| Isoleucine | 0.80% |
| Leucine | 1.3 |
| Lysine | 0.51 |
| Histidine | 0.20 |
| Valine | 1.1 |
| Threonine | 6.0 |
| Glycine | 10.3 |
| Arginine | 0.42 |
| Methionine | 0.024 |
| Cystine | 0.053 |
| Phenylalanine | 0.087 |
| Tyrasine | 0.0040 |

The content of the last four components is inadequate and may be supplemented by adding nutrients as discussed below.

Food material is obtained not only by recovering undigested food from the feces, as described above, but the calcium necessary for poultry diets can be supplied in the form of comminuted egg shells. Comminuted feathers can also be used as a souce of protein. The feathers could be cooked as well as ground, so that the protein feather component would be in the form of hydrolyzed feather meal, such as disclosed in Brown et al. reissue Pat. No. Re.25,138. To render the feed more palatable, it is desirable to mix it with a greater or lesser proportion of new food depending upon the type of fowl or stock to be fed, and the desired characteristics of the feed.

The final food product is therefore produced by combining in a blender 5 the dried undigested food recovered in the drier 4 from the poultry feces, egg shells comminuted in a grinder 6, feathers comminuted in a grinder 7 and new, uneaten food and such nutrients as may be required to produce a nutritionally balanced feed. It will be understood that the proportions of the various feed components can vary widely depending upon the requirements of the fowl or stock, and the personal preference of the farmer. It is intended that cals and minerals and/or used in bacterial cultures and/or hydroponic cultures. Bacterial protein may be produced by such bacterial cultures and green fodder can be produced by hydroponic cultures which can be used as additional food or food ingredients for fowl or stock feed. A representative utilization of such liquid is indicated in the drawing.

Liquid can be transferred from the settling tank 9 to a bacterial culture 11, and such liquid can be supplemented by spent respiration gases which are principally carbon dioxide and nitrogen. Modern poultry houses have completely controlled air-conditioning systems in which the air is recirculated. During such recirculation the temperature and humidity of the air is adjusted. Such air can be bubbled through the bacterial culture phase of the material containing food undigested by the poultry.

2. The method defined in claim 1, including adding comminuted egg shells to the solid phase of the resulting material and blending such solid phase and such comminuted egg shells.

3. The method defined in claim 1, including adding comminuted feathers to the solid phase of the resulting material and blending such solid phase and such comminuted feathers.

4. The method defined in claim 1, in which the aqueous base liquid is alkaline liquid.

5. The method of producing a composite fowl or stock feed which comprises comminuting poultry feces, agitating a mixture of aqueous base liquid and such comminuted poultry feces for dissolving from the feces components soluble in such aqueous base liquid, separating the solid phase and the liquid phase of the agitated mixture, heat-drying and simultaneously sterilizing the separated solid phase, and blending with other food components such solid phase containing food undigested by the poultry.

6. The method defined in claim 5, in which the aqueous base liquid is alkaline liquid.

* * * * *

PO-1050
(5/69)

UNITED STATES PATENT OFFICE
CERTIFICATE OF CORRECTION

Patent No. 3,961,096          Dated June 1, 1976

Inventor(s) Carl F. Emanuel (deceased) by his executrix, Mary Victoria Emanuel

It is certified that error appears in the above-identified patent and that said Letters Patent are hereby corrected as shown below:

Title page, section 75, before "Mary" insert --Carl F. Emanuel (deceased) by his executrix,--.

Signed and Sealed this

Fifteenth Day of March 1977

[SEAL]

Attest:

RUTH C. MASON
Attesting Officer

C. MARSHALL DANN
Commissioner of Patents and Trademarks